United States Patent
Hooker et al.

(10) Patent No.: US 9,753,711 B1
(45) Date of Patent: Sep. 5, 2017

(54) AUTOMATED IMPLEMENTATION OF BEST PRACTICES FOR SOLUTION DEPLOYMENT

(71) Applicant: EMC Corporation, Hopkinton, MA (US)

(72) Inventors: Richard A. Hooker, Milford, MA (US); Mohamed Amr Elayouty, Cary, NC (US); Roko Peros, Raleigh, NC (US); Pat Healy, Cork (IE); John S. Currie, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 294 days.

(21) Appl. No.: 14/040,264

(22) Filed: Sep. 27, 2013

(51) Int. Cl.
*G06F 9/445* (2006.01)

(52) U.S. Cl.
CPC .................................. *G06F 8/61* (2013.01)

(58) Field of Classification Search
None
See application file for complete search history.

(56) References Cited

U.S. PATENT DOCUMENTS

| | | | |
|---|---|---|---|
| 7,346,533 B1 | 3/2008 | Creel et al. | |
| 7,533,380 B2 * | 5/2009 | Neuer et al. | 717/177 |
| 7,930,476 B1 * | 4/2011 | Castelli et al. | 711/114 |
| 8,005,803 B2 * | 8/2011 | Graefe et al. | 707/694 |
| 8,082,330 B1 * | 12/2011 | Castelli | G06F 9/5016 |
| | | | 709/220 |
| 8,095,764 B1 * | 1/2012 | Bauer et al. | 711/170 |
| 8,245,185 B2 * | 8/2012 | Shapiro | 717/106 |
| 8,255,803 B1 * | 8/2012 | McAdam et al. | 715/735 |
| 8,346,735 B1 * | 1/2013 | Tang et al. | 707/675 |
| 8,429,002 B2 | 4/2013 | Chandra | |
| 8,661,432 B2 * | 2/2014 | Kriebel et al. | 717/175 |
| 2005/0198629 A1 * | 9/2005 | Vishwanath | G06F 8/61 |
| | | | 717/174 |
| 2006/0101374 A1 * | 5/2006 | Lim | G06F 8/61 |
| | | | 717/102 |
| 2007/0033273 A1 * | 2/2007 | White | G06F 8/30 |
| | | | 709/223 |
| 2008/0263511 A1 * | 10/2008 | Shapiro | G06F 8/61 |
| | | | 717/104 |
| 2009/0222811 A1 * | 9/2009 | Faus et al. | 717/173 |
| 2011/0087522 A1 * | 4/2011 | Beaty et al. | 705/7.38 |
| 2011/0119113 A1 * | 5/2011 | Chatterjee et al. | 705/7.36 |
| 2011/0161921 A1 * | 6/2011 | Garimella et al. | 717/105 |
| 2011/0264592 A1 | 10/2011 | Graupner et al. | |
| 2012/0278503 A1 * | 11/2012 | DeCusatis et al. | 709/240 |
| 2013/0152047 A1 * | 6/2013 | Moorthi | G06F 11/368 |
| | | | 717/124 |
| 2014/0052773 A1 * | 2/2014 | Deng et al. | 709/203 |

* cited by examiner

*Primary Examiner* — Insun Kang
(74) *Attorney, Agent, or Firm* — BainwoodHuang (57) ABSTRACT

Improved techniques involve expressing the best practices for installing a product into a machine-readable language. In particular, a vendor generates code representing best practices procedures for installing a product in the machine-readable language. The vendor makes the expression of this code available in a best-practices script to its customers. When a customer is ready for installation of the product, the customer issues a request and receives the script. The customer has software available on an installation device that runs the script and provides a wizard that automates the installation process.

17 Claims, 5 Drawing Sheets

Acquiring a best practices procedure for installing the product according to a set of metrics
102

Expressing the best practices procedure for installing the product into a machine-readable language, the expression of the best practices procedure into the machine-readable language forming a best practices script
104

Transmitting the best practices script to an electronic device at an installation site at which the product is located, the electronic device translating the best practices script into instructions that cause the electronic device to provide an automated installation of the product
106

Fig. 5(b) 110

Receiving a best practices script configured to perform an installation on a product according to a best practices procedure, the best practices procedure being configured to achieve a best practices result
112

Executing the best practices script
114

Verifying whether the installation of the product achieved the best practices result
116

AUTOMATED IMPLEMENTATION OF BEST PRACTICES FOR SOLUTION DEPLOYMENT

BACKGROUND

Complex products that serve enterprises have a plethora of possible configurations that are set during an installation. For example, an installation of an EMC® VNX® storage system involves setting values of parameters including a cache size, cache page size, and cache watermarks of storage processors, as well as the physical placement of the storage drives and configuration of hot spares. Such an installation may vary according to customer goals in connection with, e.g., performance and power consumption.

Because of the complexity of the installation of such products, there typically exists a best practices procedure for installing a product in order that the product operates according to documented specifications. A conventional best practices procedure involves making a best practices document available to customers for installation. A best practices document is a record of a procedure that has been tested and verified to provide optimal operation of a product. Such a document may be provided with the product or made available on a server over a network. Without such best practices documentation, a customer installation of a product without sufficient expertise may result in suboptimal performance of the product. Using such a best practices document, on the other hand, a customer or vendor representative can tune installation for optimal operation according to performance and/or power consumption goals.

Occasionally, a customer may provide feedback to the vendor regarding an installation. For example, suppose that the customer discovers a flaw in the performance of a product that was not apparent at the time of installation. The customer would then provide feedback on the drop in performance, and the vendor may attempt to adjust the best practices procedure to improve that performance.

SUMMARY

Unfortunately, there are deficiencies with the above-described conventional best practices procedure. For example, complex product installations manually performed according to best practices documents may suffer from inconsistent installation quality due to human factors; the product may operate suboptimally in some cases. Such suboptimal installations can hurt the brand of the product. Further, because of potentially inconsistent installations, feedback from such installations regarding potential improvements may be unreliable.

In contrast with the above-described conventional best practices procedure which may result in inconsistent product performance that hurts the brand and makes feedback difficult, improved techniques involve expressing the best practices for installing a product into a machine-readable language. In particular, a vendor generates code representing best practices procedures for installing a product in the machine-readable language. The vendor makes the expression of this code available in a best-practices script to its customers. When a customer is ready for installation of the product, the customer issues a request and receives the script. The customer has software available on an installation device that runs the script and provides a wizard that automates the installation process.

Advantageously, the improved techniques allow for consistently optimal installations of a product over an entire customer base. Because human factors are removed from the installation process, each installation occurs as intended by the product vendor. Such performance not only helps the brand by ensuring happy customers, but also provides for reliable feedback from customers because the vendor is assured that the product is operating as intended.

One embodiment of the improved technique is directed to a method of creating an installation procedure for a product. The method includes acquiring a best practices procedure for installing the product according to a set of metrics. The method also includes expressing the best practices procedure for installing the product into a machine-readable language, the expression of the best practices procedure into the machine-readable language forming a best practices script. The method further includes transmitting the best practices script to an electronic device at an installation site at which the product is located, the electronic device translating the best practices script into instructions that cause the electronic device to provide an automated installation of the product.

Additionally, some embodiments of the improved technique are directed to an apparatus constructed and arranged to create an installation procedure for a product. The apparatus includes memory and a set of processors coupled to the memory to form controlling circuitry. The controlling circuitry is constructed and arranged to carry out the method of creating an installation procedure for a product.

Furthermore, some embodiments of the improved technique are directed to a computer program product having a non-transitory computer readable storage medium which stores code including a set of instructions which, when executed by a computer, cause the computer to carry out the method of creating an installation procedure for a product.

Another embodiment of the improved technique is directed to a method of installing a product. The method includes receiving a best practices script configured to perform an installation on a product according to a best practices procedure, the best practices procedure being configured to achieve a best practices result. The method also includes executing the best practices script. The method further includes verifying whether the installation of the product achieved the best practices result.

Additionally, some embodiments of the improved technique are directed to an apparatus constructed and arranged to install a product. The apparatus includes memory and a set of processors coupled to the memory to form controlling circuitry. The controlling circuitry is constructed and arranged to carry out the method of installing a product.

Furthermore, some embodiments of the improved technique are directed to a computer program product having a non-transitory computer readable storage medium which stores code created according to the above-described method of creating an installation procedure for a product. The code includes a set of instructions which, when executed by a computer, cause the computer to carry out the method of creating an installation procedure for a product.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques involve expressing the best practices for installing a product into a machine-readable language. In particular, a vendor generates code representing best practices procedures for installing a product in the machine-readable language. The vendor makes the expression of this code available in a best-practices script to its customers. When a customer is ready for installation of the product, the customer issues a request and receives the script. The customer has software available on an installation device that runs the script and provides a wizard that automates the installation process.

Advantageously, the improved techniques allow for consistently optimal installations of a product over an entire customer base. Because human factors are removed from the installation process, each installation occurs as intended by the product vendor. Such performance not only helps the brand by ensuring happy customers, but also provides for reliable feedback from customers because the vendor is assured that the product is operating as intended.

Figure 1:
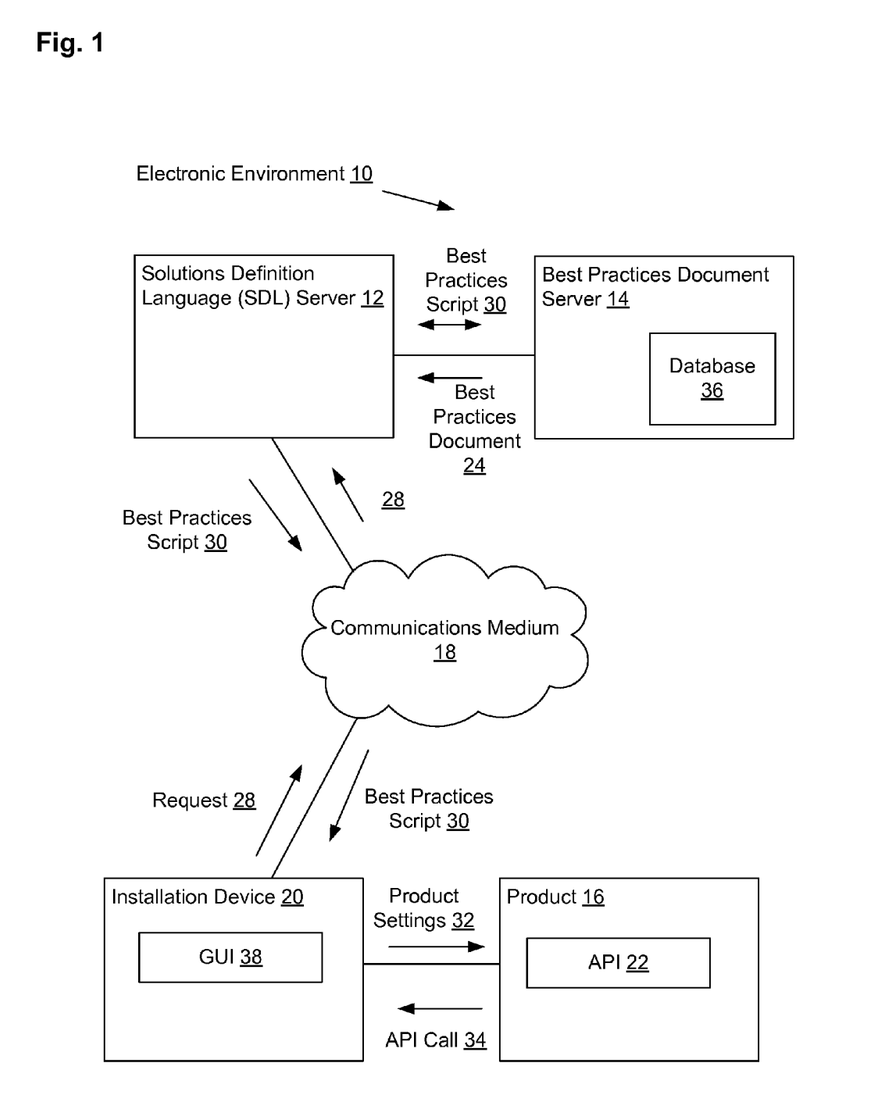
FIG. 1 is a block diagram illustrating an example electronic environment in which the improved technique may be carried out.

FIG. 1 illustrates an example electronic environment 10 in which the improved technique may be carried out. Electronic environment 10 includes solutions definition language (SDL) server 12, best practices document server 14, communications medium 18, product 16, and installation device 20.

Communications medium 18 provides network connections between SDL server 12 and installation device 20. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Best practices document server 14 is constructed and arranged to store and provide access to best practices documents 24 and scripts 30 as needed by SDL server 12. Best practices document server 14, in some arrangements, includes a database 36 in which best practices documents 24 and scripts 30 are organized by, for example, model number of a product line.

SDL server 12 is constructed and arranged to take in a best practices procedure such as that recorded in a best practices document 24 and translate that procedure into a script 30 written in a solutions definition language (SDL). SDL server 12 is further constructed and arranged to send scripts 30 written in SDL from database 36 to installation device 20 for use in installing product 16.

It should be understood that SDL, in some arrangements, takes the form of a markup language that is able to represent the configuration space of a product in a standardized way. For example, suppose that the product is part of a product line sold by a vendor. The configuration of each product in that product line is able to be represented within the SDL because the SDL covers the configuration space of all products in the product line. In particular, for the EMC (EMC Corp., Hopkinton, Mass.) VNX line of storage systems, script 30 would have to be able to consider values of parameters such as cache size, cache page size, and cache watermarks of storage processors, as well as the physical placement of the storage drives and configuration of hot spares, as well as other parameters specific to specific models within the VNX line. Example SDL code is illustrated in the Appendix below.

It should also be understood that SDL server 12 is able to take, as input to the formation of a script 30, manual input from a, e.g., a programmer who translates a best practices procedure into SDL. In such a case, SDL server 12 may, in some arrangements, use script 30 as a best practices document 24 to be made available to those who need such a document. In some further arrangements, SDL server may convert script 30 into a textual document that may be read by a user.

In other arrangements, however, SDL server 12 takes as input to the formation of script 30 a best practices document 24 and automatically converts document 24 into an SDL script 30. In this case, SDL server 12 scans document 24 for keywords that represents configuration parameters or metadata for product 16. SDL server 12 would then apply some logical rules, e.g., nearest number after a configuration parameter is taken to be the value of that parameter, in order to build script 30.

Installation device 20 is constructed and arranged to perform an install of product 16 from best practices script 30. Along these lines, installation device 20 may take the form of a desktop computer, laptop computer, tablet computer, smartphone, and the like that has compatibility with product 16 for installation purposes. Installation device 20 then includes a graphical user interface 24 for displaying output from software running script 30 to a user responsible for the installation.

Product 16 includes application programming interface (API) 38, which is configured to provide commands to installation device 20.

During an example operation, SDL server 12 obtains a best practices procedure in the form of a best practices document 24 stored on database 36. In some arrangements, this may be in response to a request from installation device 20, or simply as a part of an effort to convert all documents 24 to scripts 30.

SDL server 12 scans document 24 for keywords that include configuration parameters of product 16 and their respective values as described above. SDL server 12 then uses these keywords and values as the basis for building best practices script 30. SDL server 12 then stores script 30 in database 36.

In response to a request 28 from installation device 20, SDL server 12 sends script 30 to installation server 20 via communications medium 18. In some arrangements, request 28 originates from a call 34 from API 22 in product 16. In other arrangements, however, installation server 20 accesses script 30 from database 36 using a browser window in GUI 38.

After receipt of script 30, installation server 20 runs script 30 using software that is configured to execute SDL scripts. Installation server 20 displays, as part of the installation process, an installation wizard in GUI 38. As part of the wizard, installation server 20 displays questions to a user responsible for the installation of product 16 based on configuration parameters in script 30 that either have a range of values or no values set. The user then inputs responses to the questions, which then completes the input required for installation.

Installation device 20 then sends product settings 32 as values of the configuration parameters from script 30 to API 22 in product 16 as part of the installation. Once API 22 receives settings 32, installation device 20 completes installation of product 16 according to product settings 32.

Once product 16 is installed and is performing it functions, installation device 20 observes metrics of the performance and verifies that product 16 is in fact performing as expected. Further details of this verification and subsequent feedback are described below in connection with FIG. 4.

Further details of SDL server 12 are described below in connection with FIG. 2.

Figure 2:
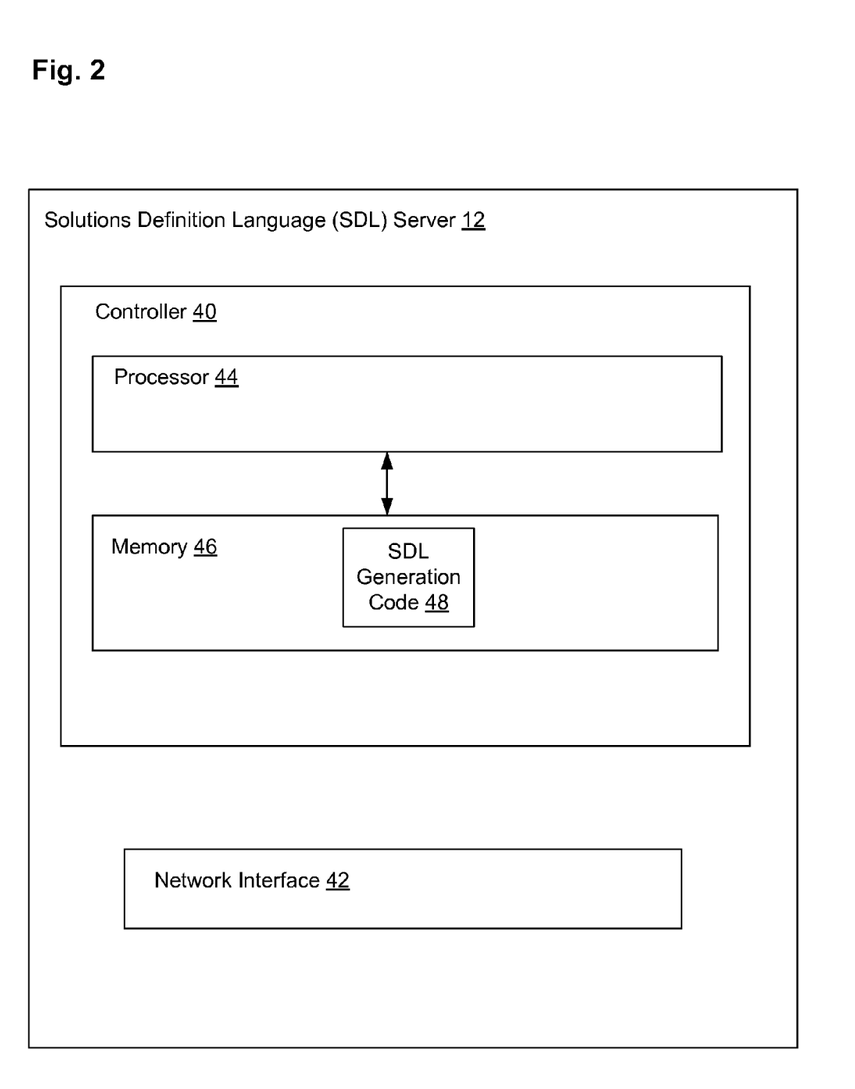
FIG. 2 is a block diagram illustrating an example solution deployment language (SDL) server within the electronic environment shown in FIG. 1.

FIG. 2 illustrates SDL server 12. SDL server 12 includes controller 40, which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store code 48 that contains instructions to create an installation procedure for a product. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from SDL generation code 48.

Further details of installation device 20 are discussed below in connection with FIG. 3

Figure 3:
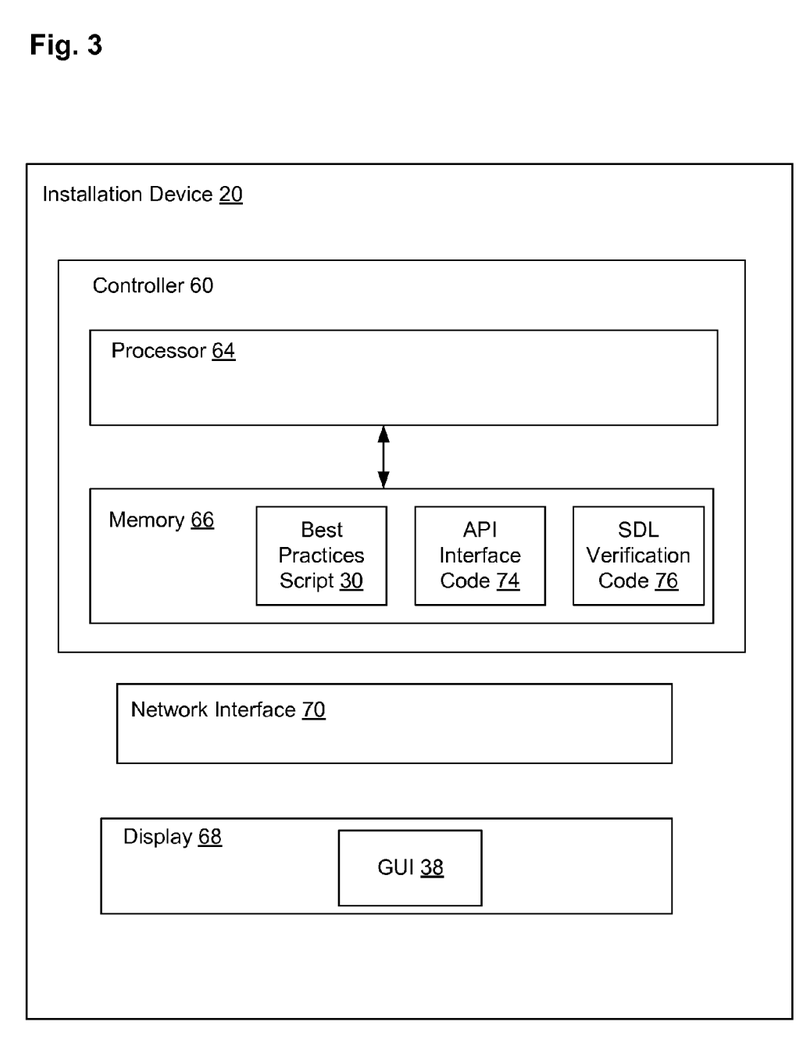
FIG. 3 is a block diagram illustrating an example installation device within the electronic environment shown in FIG. 1.

FIG. 3 illustrates installation device 20. Installation device 20 includes controller 60, which in turn includes processor 64 and memory 66, display 68, and network interface 70.

Network interface 70 takes the form of an Ethernet card; in some arrangements, network interface 70 takes other forms including a wireless receiver and a token ring card.

Memory 66 is configured to store best practices script 30, API interface code 74, and SDL verification code 76. Memory 46 generally takes the form of, e.g., random access memory, flash memory or a non-volatile memory.

API interface code 74 contains instructions to receive commands from API 22 and to provide product settings 32 to API 22.

SDL verification code 76 contains instructions to provide a verification that product 16 is performing according to best practices expressed in script 30.

Processor 44 takes the form of, but is not limited to, Intel or AMD-based MPUs, and can include a single or multi-cores each running single or multiple threads. Processor 44 is coupled to memory 46 and is configured to execute instructions from script 30, API interface code 74, and SDL verification code 76.

Further details of SDL verification and subsequent feedback are discussed below in connection with FIG. 4.

Figure 4:
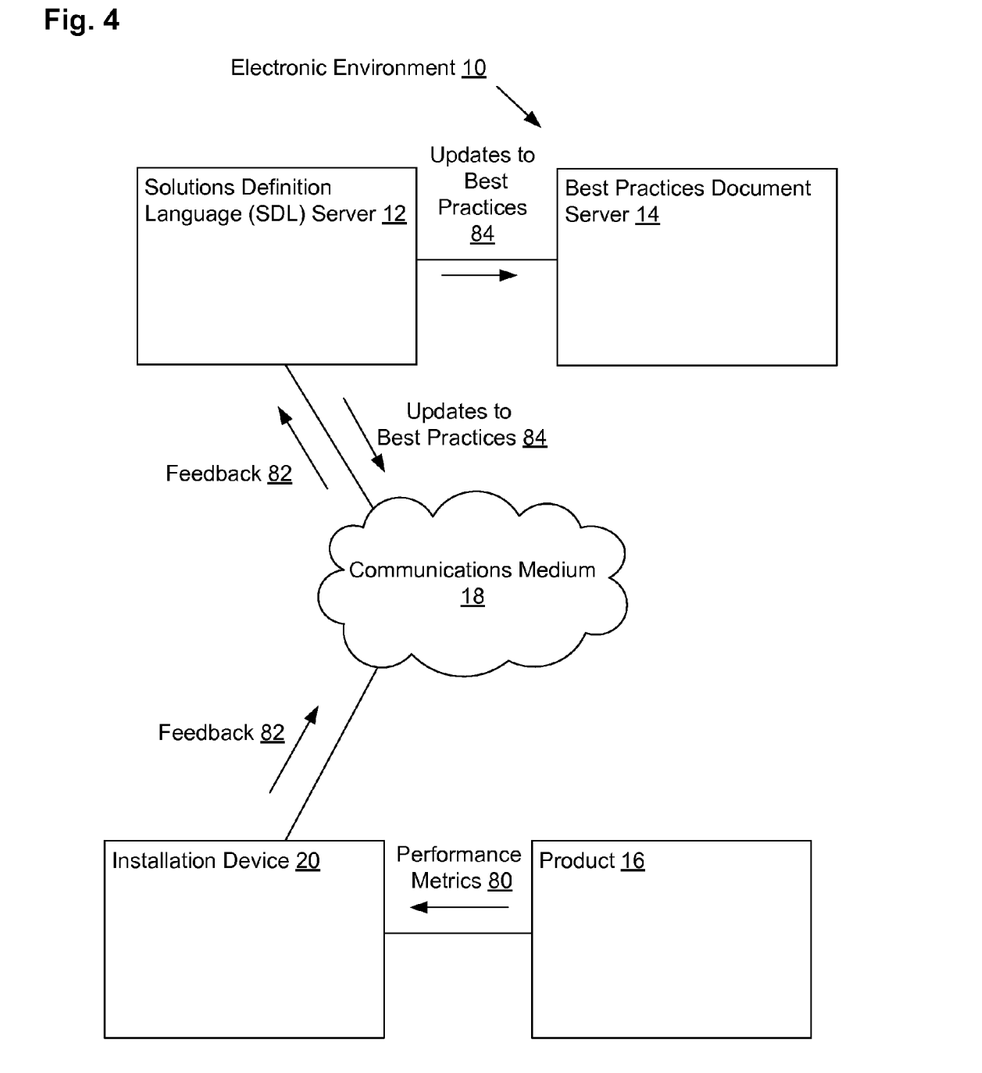
FIG. 4 is a block diagram illustrating an example feedback operation within the electronic environment shown in FIG. 1.

FIG. 4 illustrates electronic environment 10 as described above in connection with FIG. 1. As the discussion above alluded to, API 22 of product 16 sends performance metrics 80 to installation device 20 as part of averification that the installation as directed by SDL script 30 is causing product 16 to function according to expectations. Performance metrics 80 may include, for example, IOPS, power consumed, and the like.

Installation device 20, using instructions from SDL verification code 76, provides feedback 82 to SDL server 12 via communications medium 18 as to how SDL script 30 is performing based on performance metrics 80. Feedback 82 may include a comparison of performance metrics 80 to an expected performance; in some arrangements, feedback 82 may also include a diagnostic of components of product 16 that indicates which component may be responsible for lower-than-expected performance.

After SDL server 12 receives feedback 82, SDL server 12 presents feedback 82 to the vendor. The vendor, in response to feedback 82, may provide updates 84 to script 30 in order to ensure that the product is meeting performance specifications. In some arrangements, SDL server 12 automatically provides updates 84 in response to feedback 82. In this case, feedback 82 is properly formatted in, e.g., a markup language such as SDL to enable the automated update.

It should be understood that the above example assumed that SDL server 12 and best practices document server are separate, and that installation device 20 and product 16 are separate. In some arrangements, however, one or both of these pairs are a single unit.

It should also be understood that the above-described improved techniques provide for a framework in which installations of products across a product line are performed in a consistent manner, automatically, based on established best practices. The improved techniques avoid the human factors that may result in inconsistent installations and subsequent product performance. Consistent performance of products installed according to best practices maintains the integrity of the brand associated with the products.

Figure 5A:
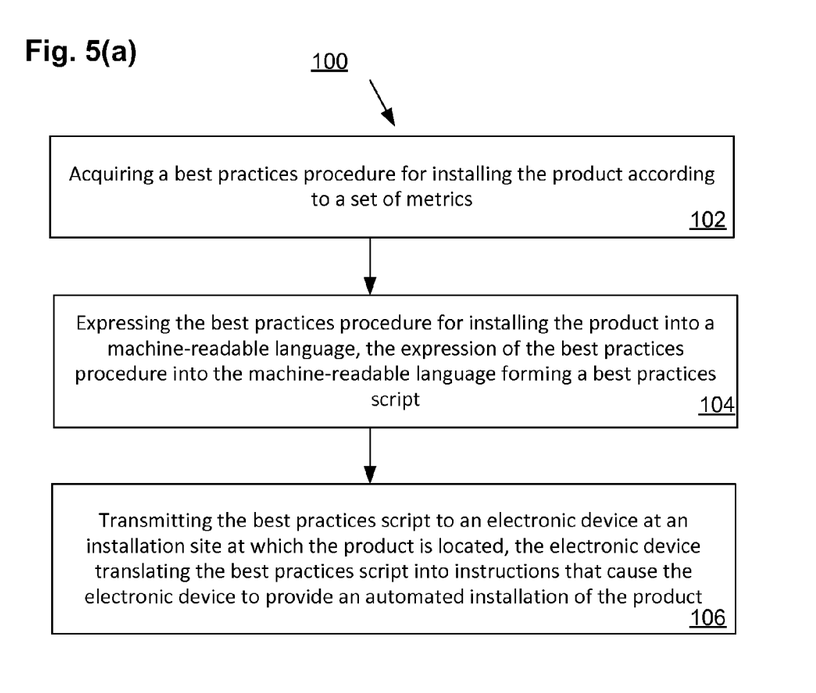
FIG. 5(a) is a flow chart illustrating an example method of carrying out the improved technique within the electronic environments shown in FIG. 1.

FIG. 5(a) illustrates a method 100 of creating an installation procedure for a product, e.g., product 16, including steps 102, 104, and 106. In step 102, a best practices procedure, e.g., document 14, is acquired for installing the product according to a set of metrics. In step 104, the best practices procedure for installing the product is expressed in a machine-readable language, e.g., SDL, the expression of the best practices procedure into the machine-readable language forming a best practices script, e.g., script 30. In step 106, the best practices script is transmitted to an electronic device, e.g., installation device 20, at an installation site at which the product is located, the electronic device translating the best practices script into instructions that cause the electronic device to provide an automated installation of the product.

Figure 5B:
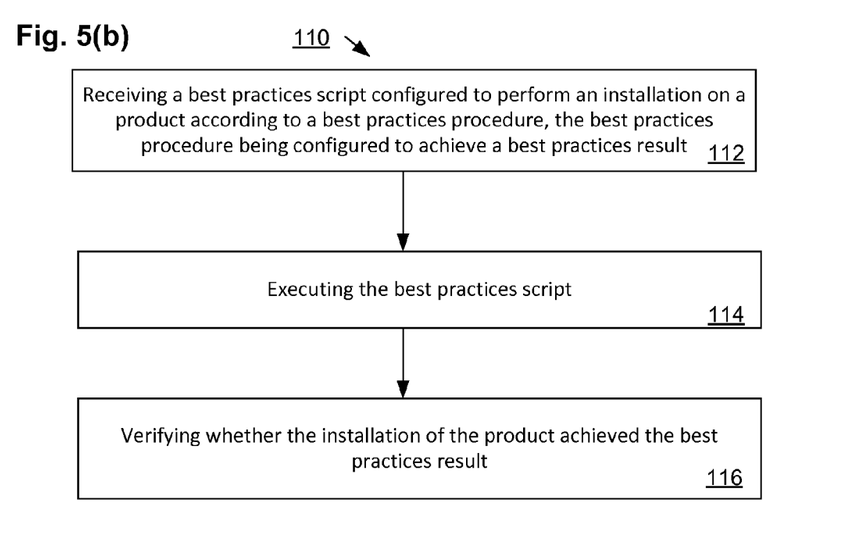
FIG. 5(b) is a flow chart illustrating another example method of carrying out the improved technique within the electronic environments shown in FIG. 1.

FIG. 5(b) illustrates a method 110 of installing a product, e.g., product 16, including steps 112, 114, and 116. In step 112, a best practices script, e.g., script 30, configured to perform an installation on a product according to a best practices procedure is received, the best practices procedure being configured to achieve a best practices result. In step 114, the best practices script is executed. Step 116 involves verifying whether the installation of the product achieved the best practices result.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

It should be understood that the improvement described here has a number of applications, including providing a technique for creating an installation procedure for a product.

Having described certain embodiments, numerous alternative embodiments or variations can be made. For example, the above discussion dealt mainly with the installation of a product. However, in some arrangements, the improved techniques apply to deploying a solution in the form of an integrated set of software and hardware components that serves as a specific business use-case. For example, the improved techniques may apply to integration of disparate components that are to be shipped to a customer site.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

APPENDIX

The following is an example of SDL code, which takes the form of a markup language. In this case, product 16 is a data storage product (EMC VNX series) on which a Microsoft Exchange database is to be run.

```
<Solution>
    <SolutionName>ExchangeOnVMware</SolutionName>
    <SolutionComponents>
        <SolutionComponent>
            <Component Type>Storage</ComponentType>
            <ConfigurationElements>
                <ConfigurationElement>
                    <ElementName>StorageSystem</ElementName>
                    <RecommendedModels>
                        <RecommendedModel>VNX5500</RecommendedModel>
                        <RecommendedModel>VMAX10K</RecommendedModel>
                    </RecommendedModels>
                </ConfigurationElement>
                <ConfigurationElement>
                    <ElementName>LUN</ElementName>
                    <RAIDlevel>RAID-6</RAIDlevel>
                    <DiskType>SAS</DiskType>
                    <VirtualProvisioned>True</VirtualProvisioned>
```

-continued

```
                    <ApplicationUsage>ExchangeDatabase</ApplicationUsage>
                </ConfigurationElement>
                . . .
            </ConfigurationElements>
        </SolutionComponent>
        <SolutionComponent>
            <Component Type>ExchangeServer</ComponentType>
            <ConfigurationElements> . . . </ConfigurationElements>
        </SolutionComponent>
        . . .
    </SolutionComponents>
</Solution>
```

What is claimed is:

1. A method of creating an installation procedure for a product, the method comprising:
    acquiring a best practices procedure for installing the product according to a set of metrics;
    automatically expressing the best practices procedure for installing the product into a machine-readable language, the expression of the best practices procedure into the machine-readable language forming a best practices script; and
    transmitting the best practices script to an electronic device at an installation site at which the product is located, the electronic device being configured to translate the best practices script into instructions that cause the electronic device to perform an automated installation of the product;
wherein:
    the best practices procedure enables the product to be installed for optimal operation according to the set of metrics, the set of metrics including hardware performance goals and a set of parameters defining a configuration of the product;
    acquiring the best practices procedure for installing the product according to the set of metrics includes receiving as input a best practices document that specifies values of the set of parameters;
    automatically expressing the best practices procedure for installing the product into the machine-readable language includes scanning the best practices document for keywords that represent the set of parameters;
    the product is a data storage system produced as part of a line of data storage systems, each data storage system of the line of data storage systems having distinct values of the set of parameters;
    the set of parameters includes (i) storage processor parameters defining operation of a storage processor of the data storage system of the line of data storage systems and (ii) storage drive parameters defining operation of storage drives of each data storage system of the line of data storage systems; and
    scanning the best practices document for keywords that represent the set of parameters includes searching the best practices document for keywords that describe the storage processor parameters and the storage drive parameters.

2. A method as in claim 1,
    wherein expressing the best practices procedure further includes:
        translating the best practices document into the machine-readable language.

3. A method as in claim 1, further comprising:
    receiving feedback as to whether an installation of the device complies with the best practices procedure; and updating the best practices script in response to the feedback.

4. A method as in claim 1,
wherein the product belongs to a line of products, and the machine-readable language is common to all products within the line of products; and
wherein expressing the best practices procedure for installing the product into the machine-readable language further includes:
writing the best practices procedure in the machine-readable language common to all products within the line of products.

5. A method as in claim 1,
wherein the best practices script includes an extensible markup language (XML) document;
wherein expressing the best practices procedure for installing the product into the machine-readable language further includes:
writing the best practices in a markup language within the XML document.

6. A method as in claim 1,
wherein transmitting the best practices script to the electronic device at the installation site at which the product is located includes:
receiving a request from the electronic device in response to a call from an application programming interface (API) of the product that is configured to initiate the installation of the product at the installation site; and
sending the best practices script to the electronic device in response to the request.

7. A computer program product having a non-transitory, computer-readable storage medium which stores instructions that, when executed by a controller, causes the controller to carry out a method of installing a product co-located with the controller, the computer program product having been generated using the method of claim 1.

8. A computer program product as in claim 7, wherein the method of installing the product further comprises:
in response to verifying whether the installation of the product achieved the best practices result, sending a result of whether the installation of the product achieved the best practices result to a feedback server which is configured to track whether results of best practices procedures on products are being achieved.

9. A computer program product as in claim 7,
wherein the best practices script causes a computer to display a graphical user interface (GUI) in which an installation wizard displays a series of questions to be answered to a user, the answers being values of a set of parameters that define a state of the product being installed; and
wherein executing the best practices script includes:
displaying the set of questions in the GUI.

10. A method as in claim 1, wherein the method further comprises receiving a request generated by the electronic device, the electronic device generating the request in response to a command received from the product as the product runs an application programming interface (API) configured to initiate the automated installation; and
wherein transmitting the best practices script to the electronic device at the installation site at which the product is located includes sending the best practices script to the electronic device, the electronic device reading the machine-readable language from the best practices script in order to provide the automated installation.

11. A computer program product having a non-transitory, computer-readable storage medium which stores instructions that, when executed by a controller, causes the controller to carry out a method of creating an installation procedure for a product, the method comprising:
acquiring a best practices procedure for installing the product according to a set of metrics;
automatically expressing the best practices procedure for installing the product into a machine-readable language, the expression of the best practices procedure into the machine-readable language forming a best practices script; and
transmitting the best practices script to an electronic device at an installation site at which the product is located, the electronic device being configured to translate the best practices script into instructions that cause the electronic device to perform an automated installation of the product;
wherein:
the best practices procedure enables the product to be installed for optimal operation according to the set of metrics, the set of metrics including hardware performance goals and a set of parameters defining a configuration of the product;
acquiring the best practices procedure for installing the product according to the set of metrics includes receiving as input a best practices document that specifies values of the set of parameters;
automatically expressing the best practices procedure for installing the product into the machine-readable language includes scanning the best practices document for keywords that represent the set of parameters;
the product is a data storage system produced as part of a line of data storage systems, each data storage system of the line of data storage systems having distinct values of the set of parameters;
the set of parameters includes (i) storage processor parameters defining operation of a storage processor of the data storage system of the line of data storage systems and (ii) storage drive parameters defining operation of storage drives of each data storage system of the line of data storage systems; and
scanning the best practices document for keywords that represent the set of parameters includes searching the best practices document for keywords that describe the storage processor parameters and the storage drive parameters.

12. A computer program product as in claim 11,
wherein expressing the best practices procedure further includes:
translating the best practices document into the machine-readable language.

13. A computer program product as in claim 11, further comprising:
receiving feedback as to whether an installation of the device complies with the best practices procedure; and
updating the best practices script in response to the feedback.

14. A computer program product as in claim 11,
wherein the product belongs to a line of products, and the machine-readable language is common to all products within the line of products; and
wherein expressing the best practices procedure for installing the product into the machine-readable language further includes:

writing the best practices procedure in the machine-readable language common to all products within the line of products.

15. A computer program product as in claim 11,
wherein the best practices script includes an extensible markup language (XML) document;
wherein expressing the best practices procedure for installing the product into the machine-readable language further includes:
writing the best practices in a markup language within the XML document.

16. A computer program product as in claim 11,
wherein transmitting the best practices script to the electronic device at the installation site at which the product is located includes:
receiving a request from the electronic device in response to a call from an application programming interface (API) of the product that is configured to initiate the installation of the product at the installation site; and
sending the best practices script to the electronic device in response to the request.

17. A method of creating an installation procedure for a product, the method comprising:
acquiring a best practices procedure for installing the product according to a set of metrics;
automatically expressing the best practices procedure for installing the product into a machine-readable language, the expression of the best practices procedure into the machine-readable language forming a best practices script; and
transmitting the best practices script to an electronic device at an installation site at which the product is located, the electronic device being configured to translate the best practices script into instructions that cause the electronic device to perform an automated installation of the product;
wherein:
the best practices procedure enables the product to be installed for optimal operation according to the set of metrics, the set of metrics including hardware performance goals;
the best practices script includes an extensible markup language (XML) document, the XML document describing settings and specifications of the product, the settings and specifications including values of a set of parameters that define a state of the product upon installation;
automatically expressing the best practices procedure for installing the product into the machine-readable language includes writing the best practices procedure in a markup language within the XML document, wherein writing the best practices procedure in the markup language within the XML document includes specifying a range of values of the set of parameters allowed for the product as part of an installation of the product;
the product is a data storage system produced as part of a line of data storage systems, each data storage system of the line of data storage systems having distinct values of the set of parameters; and
specifying the range of values of the set of parameters allowed for the product includes specifying allowable ranges of values of each of:
a cache size of the data storage system;
a cache page size of the data storage system; and
a configuration of hot spares within the data storage system.

* * * * *